(12) United States Patent
Amesar (10) Patent No.: US 12,405,928 B1
(45) Date of Patent: Sep. 2, 2025

(54) SYSTEM, METHOD, AND COMPUTER PROGRAM FOR DATA VALIDATION DURING TRANSFER OF DATA FROM SOURCE TO TARGET

(71) Applicant: Amdocs Development Limited, Limassol (CY)

(72) Inventor: Sagar Amesar, Pune (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 18/597,692

(22) Filed: Mar. 6, 2024

(51) Int. Cl.
- *G06F 16/21* (2019.01)
- *G06F 11/10* (2006.01)
- *G06F 16/23* (2019.01)
- *G06F 16/27* (2019.01)

(52) U.S. Cl.
CPC ............ *G06F 16/214* (2019.01); *G06F 11/10* (2013.01); *G06F 16/2365* (2019.01); *G06F 16/27* (2019.01)

(58) Field of Classification Search
CPC .... G06F 16/214; G06F 11/10; G06F 16/2365; G06F 16/27
See application file for complete search history.

(56) References Cited

U.S. PATENT DOCUMENTS

| | | | |
|---|---|---|---|
| 10,929,384 B2* | 2/2021 | Karunanithi | G06F 11/30 |
| 10,963,435 B1* | 3/2021 | McAlister | G06F 11/0766 |
| 11,531,654 B1* | 12/2022 | Crenwelge | G06F 9/44505 |
| 2017/0220625 A1* | 8/2017 | Bourbonnais | G06F 16/2365 |
| 2018/0060349 A1* | 3/2018 | Wilmer | G06F 16/178 |
| 2022/0171788 A1* | 6/2022 | Ito | G06F 16/254 |
| 2022/0188324 A1* | 6/2022 | Ramesh | G06F 16/254 |
| 2022/0311603 A1* | 9/2022 | Szczepanik | H04L 9/14 |
| 2023/0107316 A1* | 4/2023 | Ripa | G06F 8/34 |
| | | | 700/29 |

* cited by examiner

*Primary Examiner* — Jared M Bibbee
(74) *Attorney, Agent, or Firm* — Zilka-Kotab, P.C.

(57) ABSTRACT

As described herein, a system, method, and computer program are provided for data validation during transfer of data from source to target. A transfer of data from a source to a target is detected. The data transferred from the source is compared to data at the target resulting from the transfer. The transfer is validated based on a result of the comparison. A result of the validation is output.

12 Claims, 5 Drawing Sheets

SYSTEM, METHOD, AND COMPUTER PROGRAM FOR DATA VALIDATION DURING TRANSFER OF DATA FROM SOURCE TO TARGET

FIELD OF THE INVENTION

The present invention relates to data validation.

BACKGROUND

In projects involving transfer of data from point A (source) to point B (target), there is always a challenge to validate a complete data set when the source and target are in different databases and to further automate such data comparison for multiple entities.

There is thus a need for addressing these and/or other issues associated with the prior art. For example, there is a need to provide data validation during transfer of data from source to target.

SUMMARY

As described herein, a system, method, and computer program are provided for data validation during transfer of data from source to target. A transfer of data from a source to a target is detected. The data transferred from the source is compared to data at the target resulting from the transfer. The transfer is validated based on a result of the comparison. A result of the validation is output.

DETAILED DESCRIPTION

Figure 1:
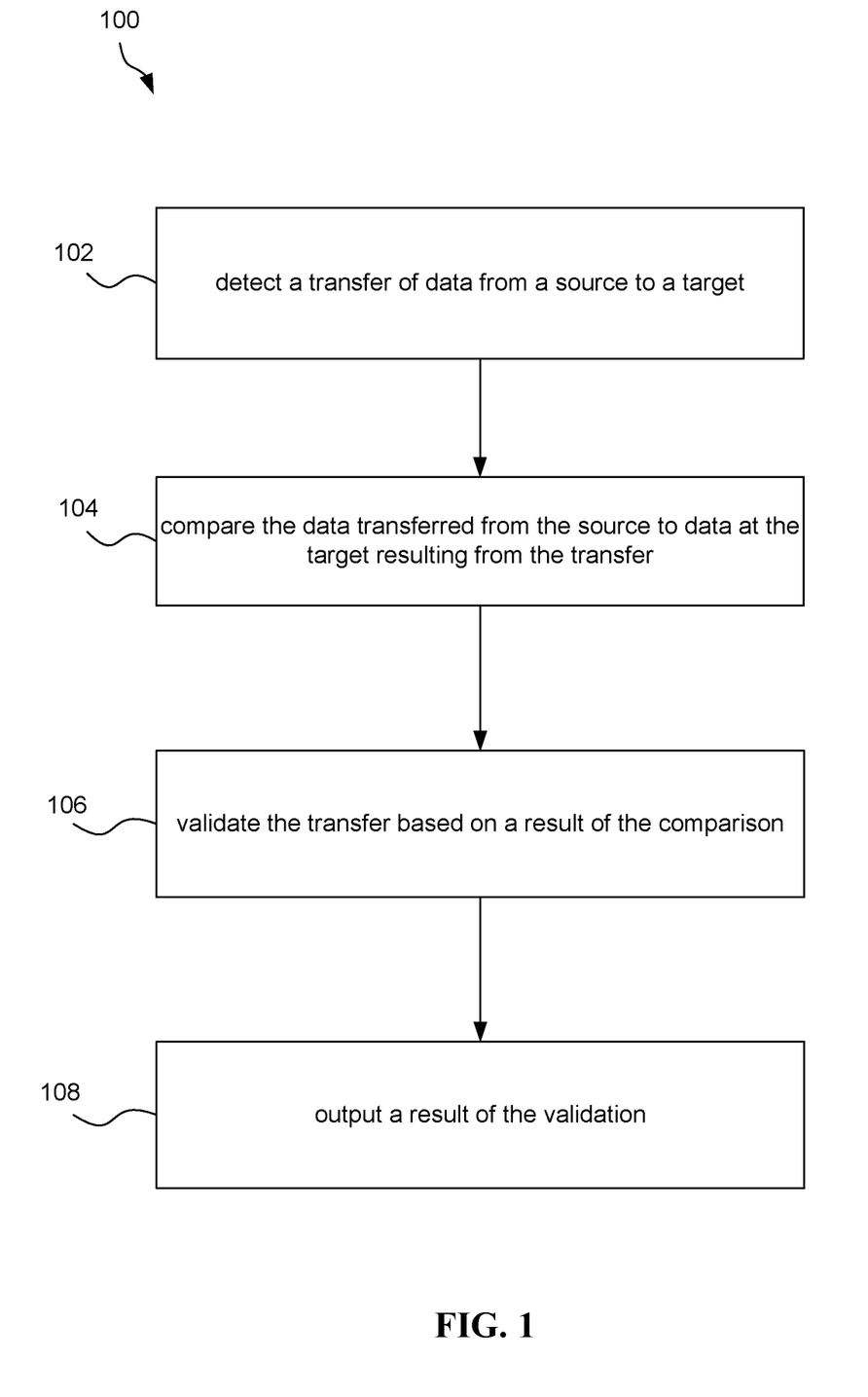
FIG. 1 illustrates a method for data validation during transfer of data from source to target, in accordance with one embodiment.

FIG. 1 illustrates a method 100 for data validation during transfer of data from source to target, in accordance with one embodiment. The method 100 may be carried out by a computer system, such as that described below with respect to FIGS. 4 and/or 5. In an embodiment, the method 100 may be carried out by a cloud-based system separate from the source and the target. For example, the cloud-based system may interface the source and target as well as a plurality of additional data sources for validating data transfers therebetween. In another embodiment, the method 100 may be carried out by an on-premises system associated with the target.

In operation 102, a transfer of data from a source to a target is detected. With respect to the present description, the source and the target refer to different storage systems capable of storing data. As mentioned, data is transferred from the source to the target, and accordingly the source and the target are also configured to communicate with one another (e.g. via a connection, a network, an interface, etc.).

The source and target may be different files or file systems, different databases, different computing systems, different memory systems, etc. In an embodiment, the source and the target are heterogenous databases. In another embodiment, the source may be a file and the target may be a database. In yet another embodiment, the source may be a database and the target may be a file.

The transfer refers to any movement of the data from the source to the target. In an embodiment, the transfer may be an upload of the data from the source to the target. In another embodiment, the transfer may be a download of the data from the source by the target. In yet another embodiment, the transfer may be a streaming of the data from the source to the target. In an embodiment, the transfer may be a migration of the data from the source to the target.

It should be noted that the data refers to any format, type, etc. of data that is stored by the source and transferred to the target. In an embodiment, the data may be in tables configured with rows and columns.

Further, the transfer may be detected in any desired manner. In an embodiment, the transfer may be detected upon receipt of a notification from the source that the data has been transferred by the source to the target. In another embodiment, the transfer may be detected upon receipt of a notification from the target that the data has been received by the target from the source. In another embodiment, the transfer may be detected by monitoring the source and/or the target for data transfers.

In operation 104, the data transferred from the source is compared to data at the target resulting from the transfer. In other words, a version of the data transferred from the source may be compared to a version of the data actually received by the target. In an embodiment, the comparison may be made in-memory.

In one embodiment, the comparison may be made using a hashes of the data transferred from the source and the data at the target resulting from the transfer. For example, the comparison may be performed by calculating a first hash for each row of the data in the source, calculating a second hash for each row of the data in the target, and performing a hash comparison by comparing the first hash of each row of the data in the source to the second hash of each respective row of the data in the target. In an embodiment, the comparing may be further performed by determining, from the hash comparison, one or more rows of the data in the source that do not match the respective row of the data in the target, and using the one or more rows to find column level mismatches between the source and the target.

In one embodiment, the comparison may be a schema comparison. In another embodiment, the comparison may be a count comparison. In another embodiment, the comparison may be a data comparison. Of course, however, the comparison may be any combination of these different comparison types.

In operation 106, the transfer is validated based on a result of the comparison. The validation will result in an indication of whether the transfer was valid or invalid. In an embodiment, the transfer may be valid when the comparison indicates that the data transferred from the source matches the data at the target resulting from the transfer. In another embodiment, the transfer may be invalid when the comparison indicates that the data transferred from the source does not match the data at the target resulting from the transfer.

In operation 108, a result of the validation is output. As mentioned above, the result will indicate whether the transfer was valid or invalid. In embodiment when the result indicates that the transfer was invalid, the result may also indicate any differences between the data transferred from the source and the data at the target resulting from the transfer. In an embodiment, the result of the validation may be output in a report (e.g. in an email). In another embodiment, the result of the validation may be output to a system for taking any required corrective action (e.g. when the transfer was invalid).

It should be noted that the method 100 may be performed for various data validation applications. In an embodiment, the validation may be performed for detecting (and optionally correcting) data loss associated with the transfer. In another embodiment, the validation may be performed for data reconciliation between the source and the target (e.g. to ensure consistency between the source and target).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
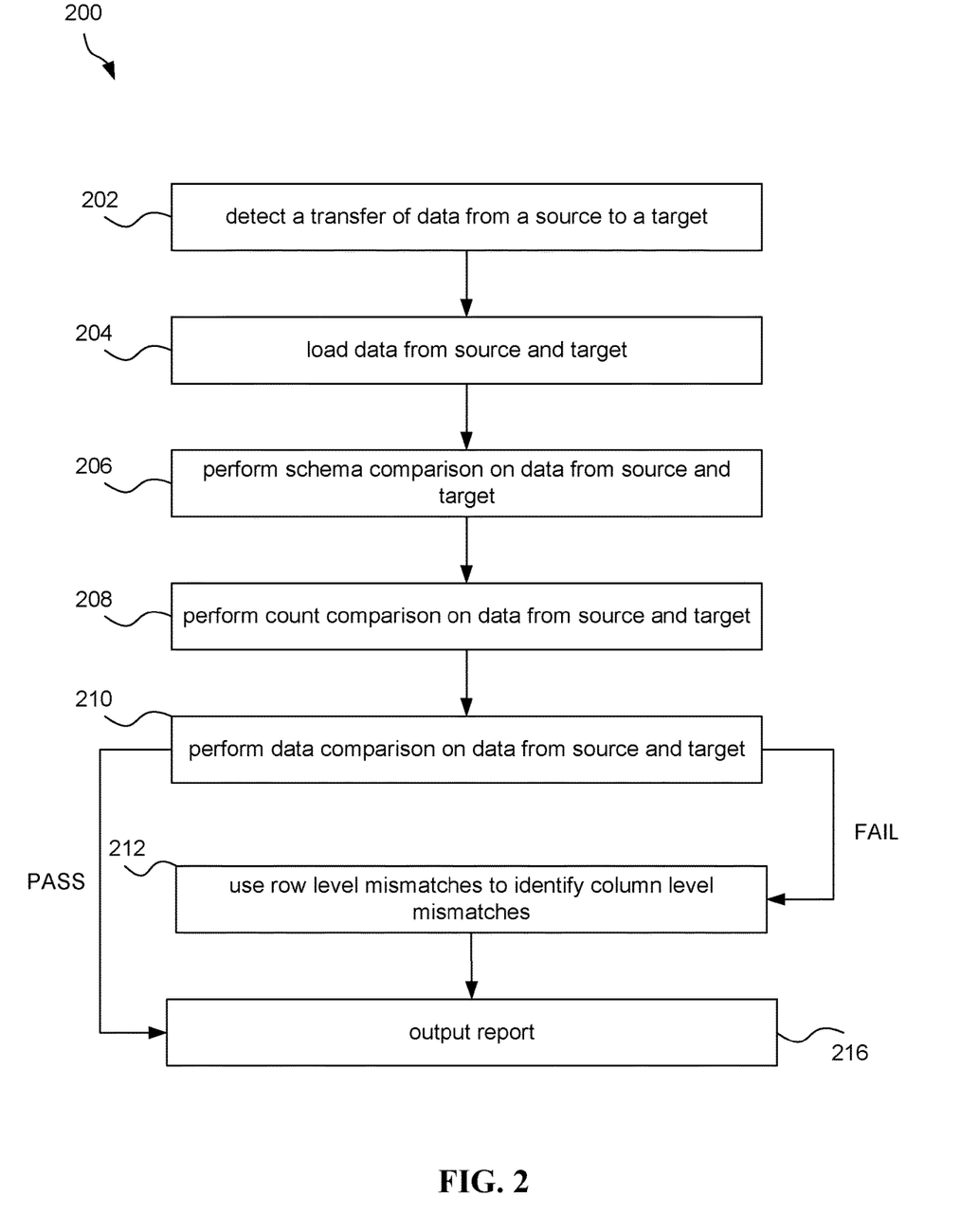
FIG. 2 illustrates a method for data validation between a file and a database, in accordance with one embodiment.

FIG. 2 illustrates a method 200 for data validation between a file and a database, in accordance with one embodiment. As an option, the method 200 may be carried out in the context of the details of the previous figure and/or any subsequent figure(s). Of course, however, the method 200 may be carried out in the context of any desired environment. Further, the aforementioned definitions may equally apply to the description below.

In operation 202, a transfer of data from a source to a target is detected. In operation 204, the data is loaded from the source and the target. The data loaded from the source refers to the data transferred by the source to the target. The data loaded from the target refers to the data received by the target from the source.

In an embodiment, the data may be loaded from the source and/or the target by making a connection to the source and by making a connection to the target. The connections may be made based on a connection type required by the source and the target. In an embodiment, the data may be loaded from the source and/or the target by using configuration files associated with the source and the target, which may indicate for example a layout of the data in respective location (source/target). In an embodiment, the data may be loaded from the source and/or the target by using a logon file to access credentials required to access the data at the respective location.

In operation 206, a schema comparison is made on the data from the source and the target. The schema comparison refers to comparing a schema of the data from the source to a schema of the data from the target. A result of the schema comparison may indicate whether the schema of the data from the source matches the schema of the data from the target.

In operation 208, a count comparison is made on the data from the source and the target. The schema comparison refers to comparing a count (of rows) of the data from the source to a count (of rows) of the data from the target. A result of the count comparison may indicate whether the count of the data from the source matches the count of the data from the target.

In operation 210, a data comparison is made on the data from the source and the target. The data comparison refers to comparing the actual data from the source to the actual data from the target. In the present example, the data from the source and the target is compared row-by-row. A result of the data comparison may indicate whether the rows of the data from the source match the rows of the data from the target.

As shown, when the data comparison indicates that the rows of the data from the source match the rows of the data from the target, then a report is output in operation 214. The result indicates the results of the schema comparison, the count comparison, and the data comparison.

As also shown, when the data comparison indicates that one or more rows of the data from the source do not match the one or more respective rows of the data from the target (i.e. data comparison "FAIL"), then in operation 212 the row-level mismatches between the source and the target are used to identify column-level mismatches between the source and the target. The report is then output in operation 214. However, in this case, the report may also specify the column-level mismatches.

The report may be used for human analysis, in an embodiment. In another embodiment, the report may be used by an automated process to take an automated required corrective action for any identified mismatches between schemas, counts, rows, and/or columns (per the comparisons 206-212 described above). The corrective action may be re-transferring the data, transferring portions of the data from the source that are missing at the target, preprocessing (e.g. reformatting, etc.) the data from the source prior to re-transfer to the target, or any other action as defined be a policy.

Figure 3:
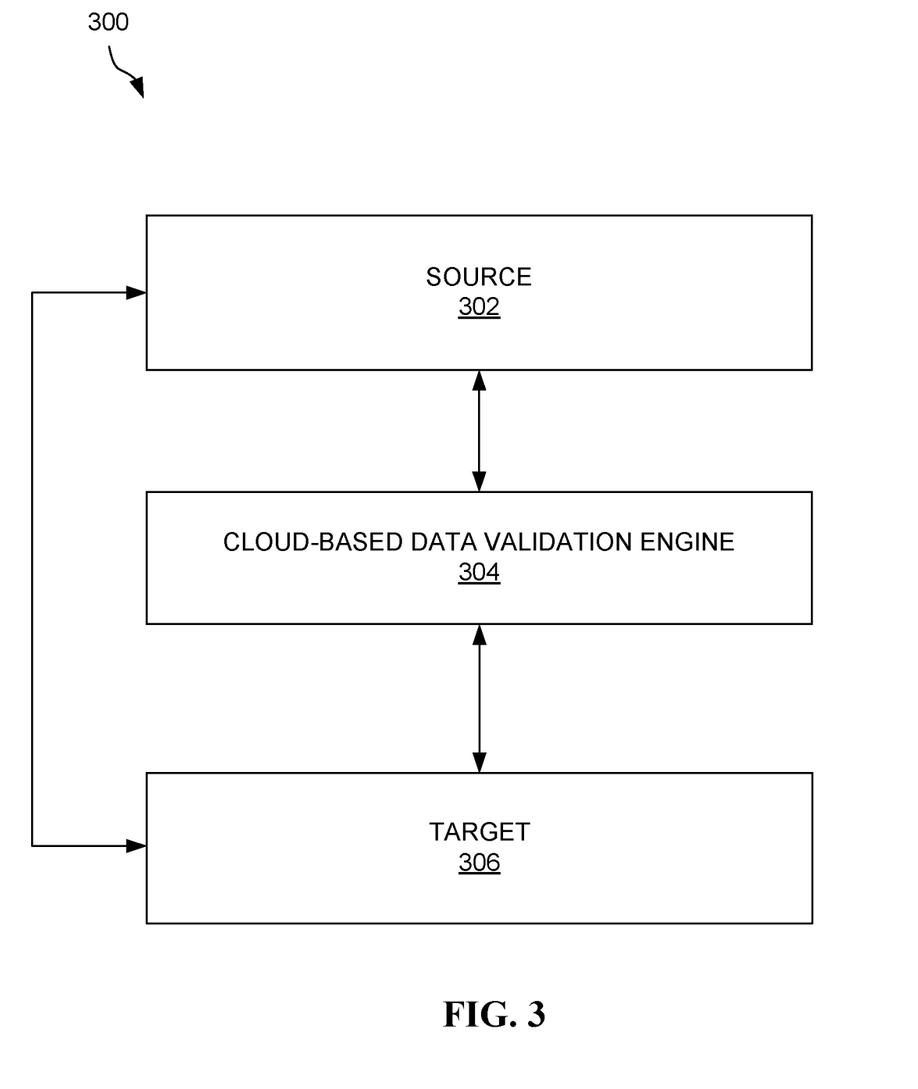
FIG. 3 illustrates a flow diagram of a system for data validation between data sources, in accordance with one embodiment.

FIG. 3 illustrates a flow diagram of a system 300 for data validation between data sources, in accordance with one embodiment. As an option, the system 300 may be implemented in the context of the details of the previous figure and/or any subsequent figure(s). Of course, however, the system 300 may be implemented in the context of any desired environment. Further, the aforementioned definitions may equally apply to the description below.

The system 300 includes a source 302, a target 306 and a cloud-based data validation engine 304. While the system 300 illustrates only a single source 302 and a single target 306, it should be noted that the cloud-based data validation engine 304 may interface any number of different data sources for the purpose of validating data transfers made therebetween. In an embodiment, the data sources may be components of a cluster-computing environment, and the cloud-based data validation engine 304 may operate with high performance on cluster mode and may provide real-time validation with low latency because of in-memory comparisons.

When a transfer of data from the source 302 to the target 306 is detected by the cloud-based data validation engine 304, the cloud-based data validation engine 304 compares the data transferred from the source 302 to data at the target 306 resulting from the transfer. The cloud-based data validation engine 304 validates the transfer based on a result of the comparison. The cloud-based data validation engine 304 then outputs a result of the validation.

Figure 4:
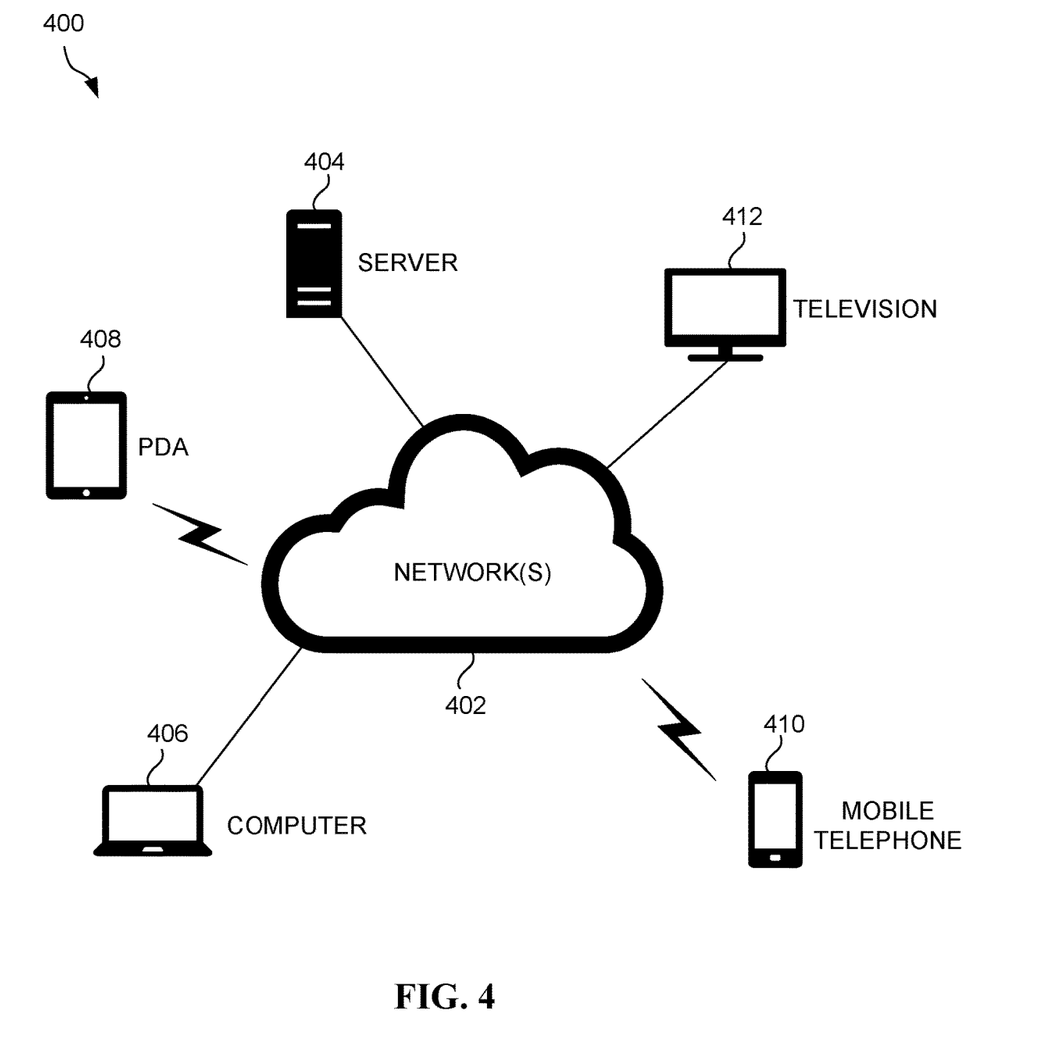
FIG. 4 illustrates a network architecture, in accordance with one possible embodiment.
Figure 5:
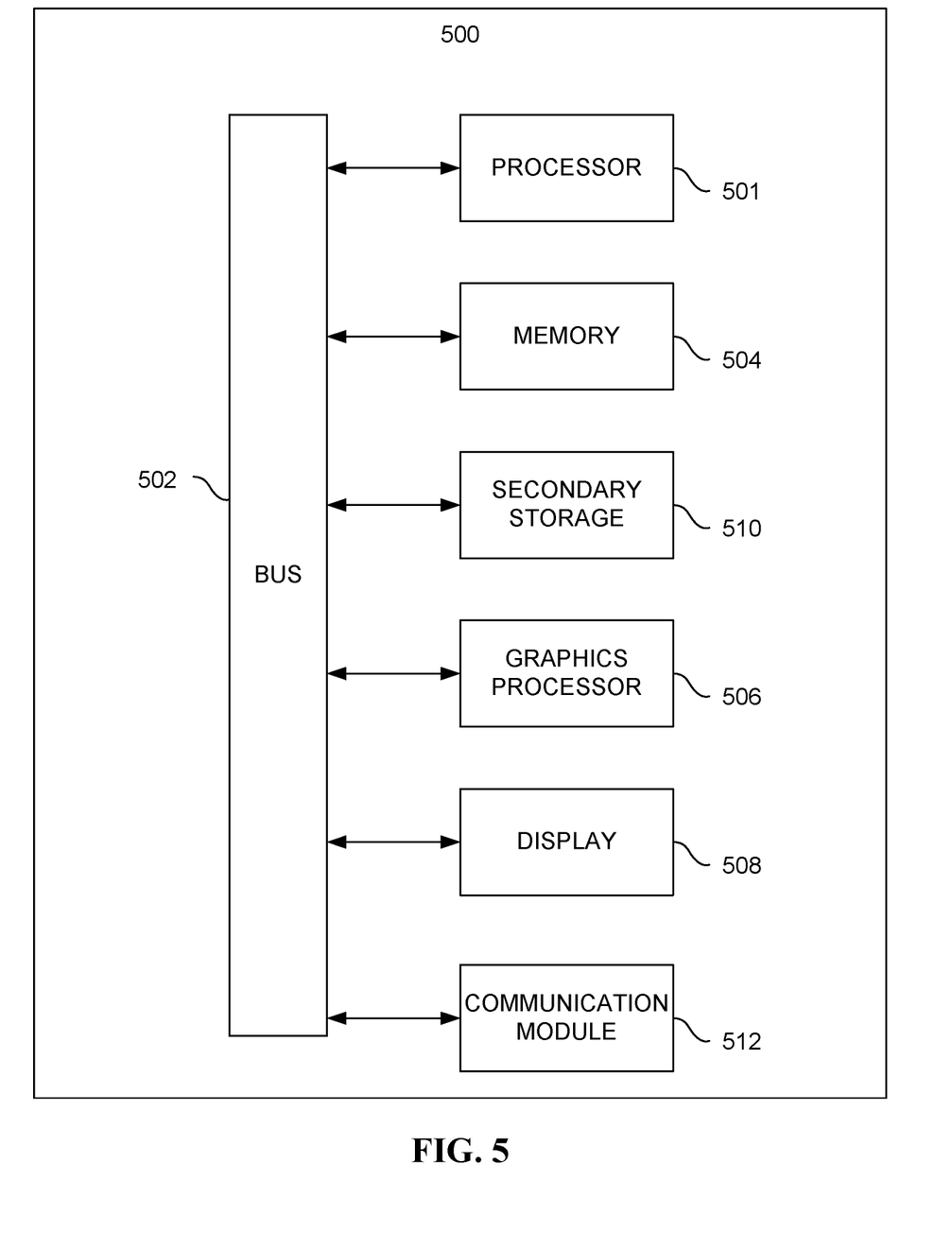
FIG. 5 illustrates an exemplary system, in accordance with one embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
   detect a transfer of data from a source to a target;
   compare the data transferred from the source to data at the target resulting from the transfer to generate a comparison result, wherein the comparison is made in-memory and includes:
      calculating a first hash for each row of the data in the source,
      calculating a second hash for each row of the data at the target, and
      comparing the first hash of each row of the data in the source to the second hash of each respective row of the data at the target to determine one or more rows of the data in the source that each do not match the respective row of the data at the target, and
      finding column level mismatches between the source and the target using the one or more rows of the data in the source that each do not match the respective row of the data at the target; and
   based on the comparison result, perform data reconciliation between the source and the target.

2. The non-transitory computer-readable media of claim 1, wherein the transfer is a migration of the data from the source to the target.

3. The non-transitory computer-readable media of claim 1, wherein the source and the target are different computing systems.

4. The non-transitory computer-readable media of claim 1, wherein the source and the target are heterogenous databases.

5. The non-transitory computer-readable media of claim 1, wherein the source is a file and the target is a database.

6. The non-transitory computer-readable media of claim 1, wherein the source is a database and the target is a file.

7. The non-transitory computer-readable media of claim 1, wherein the detecting, comparing, and performing are performed by a cloud-based system separate from the source and the target.

8. The non-transitory computer-readable media of claim 7, wherein the cloud-based system interfaces a plurality of additional data sources for validating data transfers therebetween.

9. The non-transitory computer-readable media of claim 1, wherein the detecting, comparing, and performing are performed by an on-premises system associated with the target.

10. The non-transitory computer-readable media of claim 1, wherein to perform the data reconciliation, an automated process takes an automated corrective action for the column level mismatches in the one or more rows of the data in the source that each do not match the respective row of the data at the target.

11. A method, comprising:
    at a computer system:
    detecting a transfer of data from a source to a target;
    comparing the data transferred from the source to data at the target resulting from the transfer to generate a comparison result, wherein the comparison is made in-memory and includes:
       calculating a first hash for each row of the data in the source,
       calculating a second hash for each row of the data at the target, and
       comparing the first hash of each row of the data in the source to the second hash of each respective row of the data at the target to determine one or more rows of the data in the source that each do not match the respective row of the data at the target, and
       finding column level mismatches between the source and the target using the one or more rows of the data in the source that each do not match the respective row of the data at the target; and
    based on the comparison result, performing data reconciliation between the source and the target.

12. A system, comprising:
    a non-transitory memory storing instructions; and
    one or more processors in communication with the non-transitory memory that execute the instructions to:
    detect a transfer of data from a source to a target;
    compare the data transferred from the source to data at the target resulting from the transfer to generate a comparison result, wherein the comparison is made in-memory and includes:
       calculating a first hash for each row of the data in the source,
       calculating a second hash for each row of the data at the target, and
       comparing the first hash of each row of the data in the source to the second hash of each respective row of the data at the target to determine one or more rows of the data in the source that each do not match the respective row of the data at the target, and
       finding column level mismatches between the source and the target using the one or more rows of the data in the source that each do not match the respective row of the data at the target; and based on the comparison result, perform data reconciliation between the source and the target.

\* \* \* \* \*